(12) United States Patent
Hino (10) Patent No.: US 9,658,448 B2
(45) Date of Patent: May 23, 2017

(54) ACTUATOR, OPTICAL SCANNER, AND IMAGE FORMATION APPARATUS

(71) Applicant: SEIKO EPSON CORPORATION, Tokyo (JP)

(72) Inventor: Makiko Hino, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 4 days.

(21) Appl. No.: 14/139,102

(22) Filed: Dec. 23, 2013

(65) Prior Publication Data

US 2014/0185117 A1 Jul. 3, 2014

(30) Foreign Application Priority Data

Dec. 27, 2012 (JP) ................. 2012-284491

(51) Int. Cl.
*G02B 26/10* (2006.01)
*G02B 26/08* (2006.01)
*G02B 26/00* (2006.01)
*G02B 27/01* (2006.01)

(52) U.S. Cl.
CPC ......... *G02B 26/101* (2013.01); *G02B 26/085* (2013.01); *G02B 26/007* (2013.01); *G02B 26/105* (2013.01); *G02B 27/0101* (2013.01)

(58) Field of Classification Search
CPC .... G02B 26/101; G02B 26/10; G02B 26/085; G01B 11/002; G01B 11/03; G01B 7/008; G01B 11/005; G01B 5/008; G01D 5/3473; G01D 5/28; G01D 5/347; G01D 5/02; G01D 5/285; G01D 5/34746; G06F 3/03

USPC ......... 359/199.3, 200.7, 202.1, 212.1–215.1, 359/436–442; 356/138, 139, 139.04, 356/139.05, 139.06, 614–618, 620, 621; 341/1–17; 33/1 R, 1 M, 1 PT
See application file for complete search history.

(56) References Cited

U.S. PATENT DOCUMENTS

| | | | |
|---|---|---|---|
| 5,912,608 A | 6/1999 | Asada | |
| 2005/0122602 A1* | 6/2005 | Kamiya | G02B 26/085 359/849 |
| 2008/0151345 A1* | 6/2008 | Zhou | B81B 3/004 359/224.1 |

(Continued)

FOREIGN PATENT DOCUMENTS

| | | |
|---|---|---|
| JP | A-8-322227 | 12/1996 |
| JP | 2006-343482 A | 12/2006 |
| JP | 2011-170299 A | 9/2011 |

*Primary Examiner* — Thomas K Pham
*Assistant Examiner* — Alberto Betancourt
(74) *Attorney, Agent, or Firm* — Oliff PLC (57) ABSTRACT

An actuator includes: a movable portion that swingably moves around a first axis; a first shaft that extends from the movable portion and swingably supports the movable portion around the first axis; a frame portion that is connected to the first shaft and swingably moves around a second axis that intersects the first axis; a second shaft that extends from the frame portion and swingably supports the frame portion around the second axis; a support portion connected to the second shaft; a coil provided on the frame portion; and a magnet that produces a magnetic field that acts on the coil, wherein the frame portion is so formed that the frame portion surrounds the movable portion, the first shaft, the second shaft, and the support portion in a plan view viewed in a thickness direction of the movable portion.

9 Claims, 7 Drawing Sheets

(56) References Cited

U.S. PATENT DOCUMENTS

| | | | |
|---|---|---|---|
| 2010/0238533 A1* | 9/2010 | Nakamura | G02B 26/0833 359/223.1 |
| 2011/0063702 A1* | 3/2011 | Takeda | G02B 26/085 359/200.7 |
| 2012/0228460 A1* | 9/2012 | Suzuki | B81B 3/0062 248/474 |
| 2013/0301099 A1* | 11/2013 | Mizoguchi | G02B 26/085 359/221.2 |

* cited by examiner

ACTUATOR, OPTICAL SCANNER, AND IMAGE FORMATION APPARATUS

BACKGROUND

1. Technical Field

The present invention relates to an actuator, an optical scanner, and an image formation apparatus.

2. Related Art

There is a known actuator using a structure including a torsional oscillator formed by processing a silicon substrate by using a MEMS (micro electro mechanical systems) technology (see JP-A-8-322227, for example). An actuator of this type is used as an optical scanner that scans an object with light in a printer, a display, and other apparatus.

For example, the actuator described in JP-A-8-322227 includes an inner movable plate having a flat-plate-like shape, a pair of second torsion bars that swingably support the inner movable plate, an outer movable plate having a frame-like shape, and first torsion bars that swingably support the outer movable plate. The thus configured actuator further includes a flat coil provided on each of the inner movable plate and the outer movable plate and permanent magnets disposed in fixed positions, and interaction between magnetic fields produced by the flat coils and the permanent magnets produces pivotal motion of the movable portions.

In the actuator described above, wiring lines from the flat coils are electrically connected to outer electrode terminals via the first torsion bars.

Further, the structure including the inner movable plate, the outer movable plate, the first torsion bars, and the second torsion bars is formed by etching a silicon substrate.

As described above, the fact that the wiring lines from the flat coils provided on the movable plates are electrically connected to the outer electrode terminals via the first torsion bars causes the distance between the flat coils and the permanent magnets disposed in fixed positions to be undesirably long.

SUMMARY

An advantage of some aspects of the invention is to provide a configuration in which a movable portion conductor pattern is provided on a base having an oscillation system and which allows the distance between a coil and a magnet to be reduced and an actuator (optical scanner) to be efficiently driven.

An actuator according to an application example includes a movable portion that swingably moves around a first axis, a first shaft that extends from the movable portion and swingably supports the movable portion around the first axis, a frame portion that is connected to the first shaft and swingably moves around a second axis that intersects the first axis, a second shaft that extends from the frame portion and swingably supports the frame portion around the second axis, a support portion connected to the second shaft, a coil provided on the frame portion, and a magnet that produces a magnetic field that acts on the coil, and the frame portion is so formed that the frame portion surrounds the movable portion, the first shaft, the second shaft, and the support portion in a plan view viewed in a thickness direction of the movable portion.

According to the actuator described above, the coil and the magnet can be so disposed that they are close to each other. The actuator can therefore efficiently drive the movable portion.

In the actuator described above, it is preferable that the movable portion is provided with a light reflector having light reflectivity.

The configuration described above allows light to be efficiently reflected.

In the actuator described above, it is preferable that a mirror holder is fixed to the movable portion, that the mirror holder has a light reflector having light reflectivity and a fixing portion that extends from one surface of the light reflector in a thickness direction of the light reflector, and that the movable portion and an end of the fixing portion are connected to each other.

According to the actuator of the configuration described above, the light reflector having a light reflection surface and the movable portion can be formed from separate substrates. The thus configured actuator allows static deformation of the light reflection surface to be reduced.

In the actuator described above, it is preferable that the light reflector and the fixing portion are formed integrally with each other.

According to the actuator of the configuration described above, the light reflector and the fixing portion can be aligned with each other with increased precision and can be readily manufactured.

In the actuator described above, it is preferable that the actuator further includes a voltage application portion that applies a voltage to the coil, and when the voltage application portion applies the voltage to the coil, the movable portion is caused to swing around the first axis and the second axis.

The configuration described above allows the movable portion to swing around the first axis and the second axis while allowing the size of the actuator to be reduced.

An optical scanner according to another application example includes a movable portion that includes a light reflector having light reflectivity and swingably moves around a first axis, a first shaft that extends from the movable portion and swingably supports the movable portion around the first axis, a frame portion that is connected to the first shaft and swingably moves around a second axis that intersects the first axis, a second shaft that extends from the frame portion and swingably supports the frame portion around the second axis, a support portion connected to the second shaft, a coil provided on the frame portion, and a magnet that produces a magnetic field that acts on the coil, and the frame portion is so formed that the frame portion surrounds the movable portion, the first shaft, the second shaft, and the support portion in a plan view viewed in a thickness direction of the movable portion.

The optical scanner described above allows the movable portion to be efficiently driven, operates at a low power consumption rate, and has excellent oscillation characteristics.

An image formation apparatus according to another application example includes a light source unit and an optical scanner that continuously deflects light from the light source unit. The optical scanner includes a movable portion that includes a light reflector having light reflectivity and swingably moves around a first axis, a first shaft that extends from the movable portion and swingably supports the movable portion around the first axis, a frame portion that is connected to the first shaft and swingably moves around a second axis that intersects the first axis, a second shaft that extends from the frame portion and swingably supports the frame portion around the second axis, a support portion connected to the second shaft, a coil provided on the frame portion, and a magnet that produces a magnetic field that acts on the coil, and the frame portion is so formed that the frame portion surrounds the movable portion, the first shaft, the second shaft, and the support portion in a plan view viewed in a thickness direction of the movable portion.

The image formation apparatus described above allows the movable portion to be efficiently driven and operates at a low power consumption rate.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferable embodiments of an actuator, an optical scanner, and an image formation apparatus will be described below with reference to the accompanying drawings. In the embodiments, a description will be made of a case where the actuator is used as an optical scanner.

First Embodiment

An optical scanner according to a first embodiment of the invention will first be described.

Figure 1:
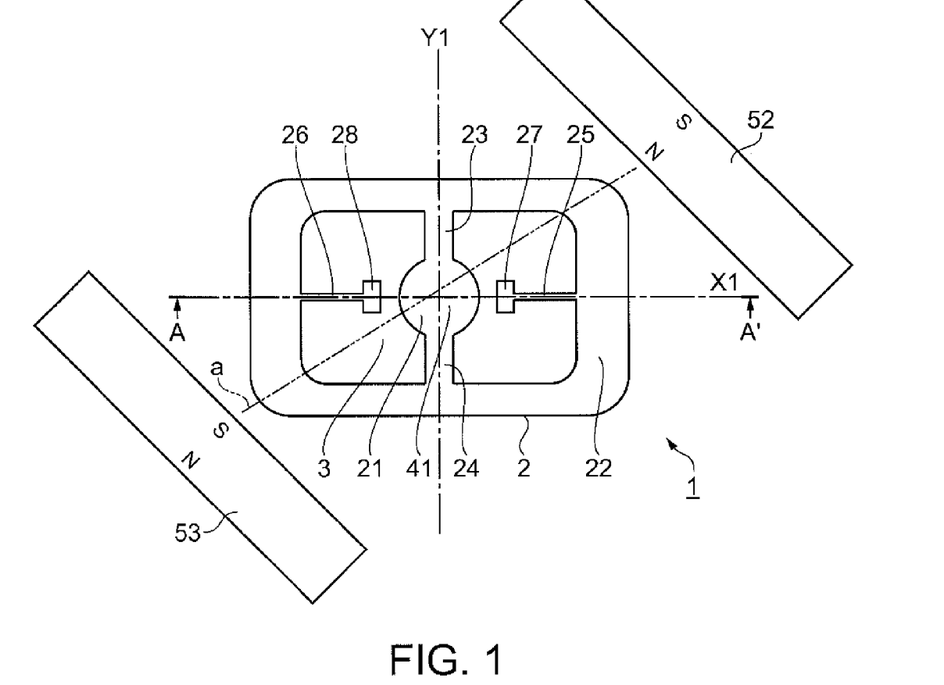
FIG. 1 is a plan view (top view) showing an optical scanner (actuator) according to a first embodiment of the invention.
Figure 2:
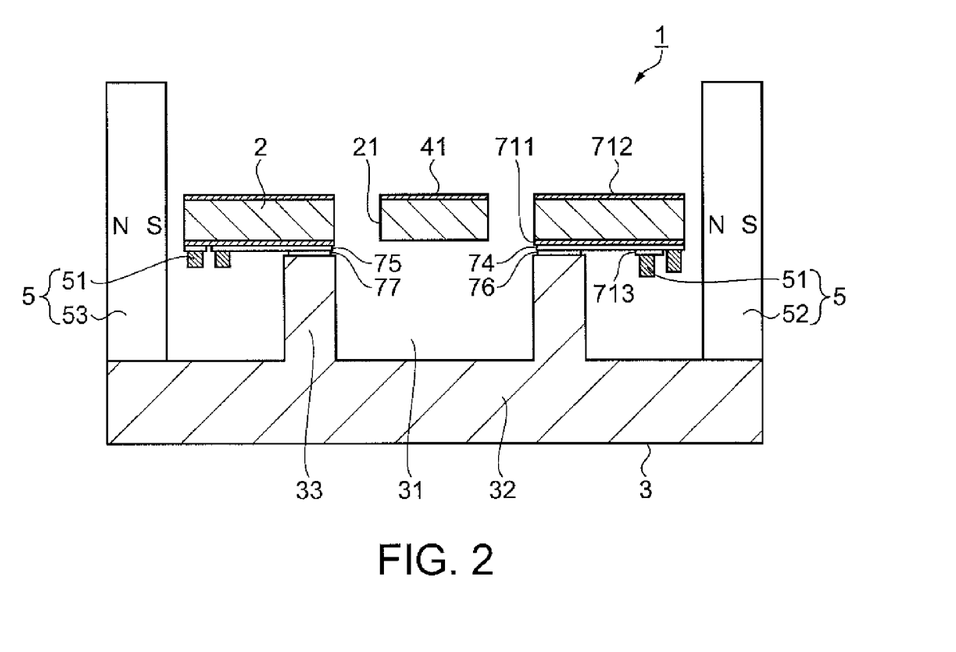
FIG. 2 is a cross-sectional view taken along the line A-A' in FIG. 1.
Figure 3:
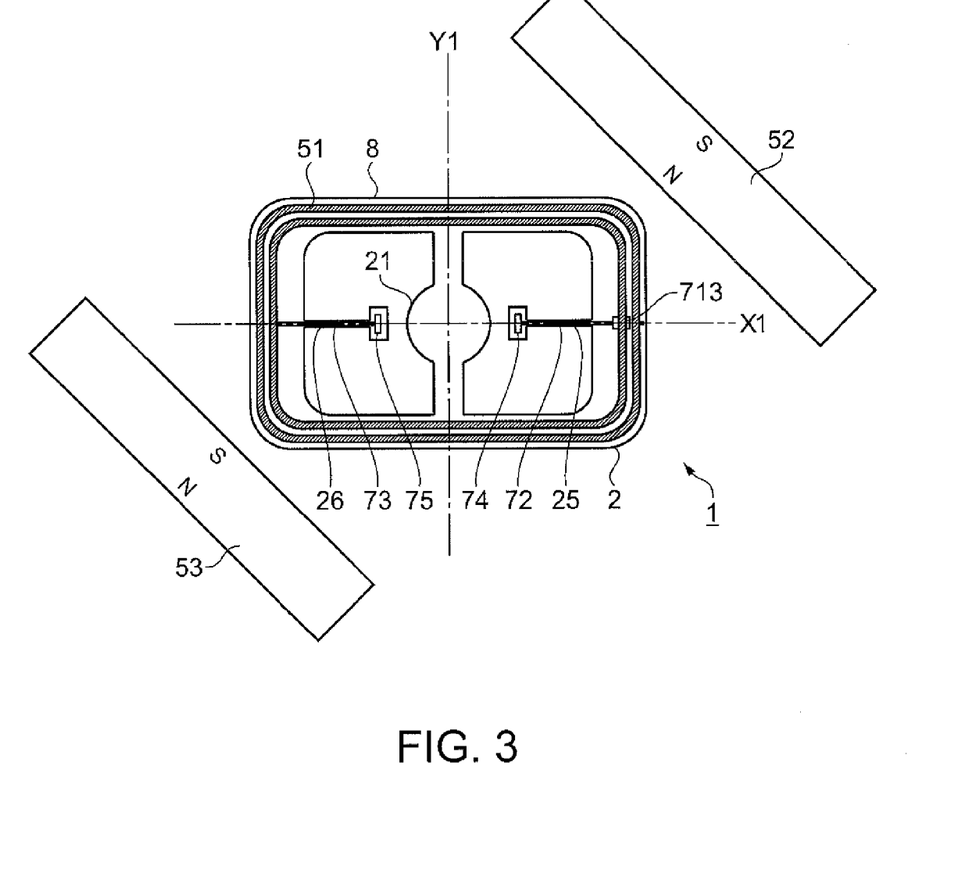
FIG. 3 is a plan view (bottom view) of the optical scanner shown in FIG. 1.

FIG. 1 is a plan view (top view) showing the optical scanner (actuator) according to the first embodiment of the invention. FIG. 2 is a cross-sectional view taken along the line A-A' in FIG. 1. FIG. 3 is a plan view (bottom view) of the optical scanner shown in FIG. 1. In the following description, the upper side in FIG. 2 is called "up," and the lower side in FIG. 2 is called "down" for ease of description.

An optical scanner 1 includes a base 2, which has two oscillation systems that pivot (swing) around axial lines X1 and Y1 perpendicular to each other, a support 3, which supports the base 2, a light reflector 41, which has a light reflection surface, and a driver 5, which causes the oscillation systems of the base 2 to oscillate, as shown in FIGS. 1 and 2.

The base 2 has a movable portion 21, a pair of first connecting portions 23 and 24, which are connected to the movable portion 21, a frame portion 22, which has a frame-like shape and supports the pair of first connecting portions 23 and 24, a pair of support portions 27 and 28, which are provided inside the frame portion 22, and second connecting portions 25 and 26, which are supported by the support portions 27 and 28 and connected to the frame portion 22.

The thus configured base 2 is made of silicon, and the movable portion 21, the first connecting portions 23 and 24, the frame portion 22, the second connecting portions 25 and 26, and the support portions 27 and 28 are formed integrally with each other. A first shaft is formed of the first connecting portions 23 and 24. A second shaft is formed of the second connecting portions 25 and 26.

Since silicon is light and as rigid as stainless steel (SUS), the base 2 made of silicon has excellent oscillation characteristics. Further, since silicon can be processed in an etching process with highly precise dimensional accuracy as will be described later, the base 2 formed of a silicon substrate is allowed to have a desired shape (desired oscillation characteristics). A single crystal silicon substrate is typically used as the silicon substrate.

The oscillation systems of the base 2 are configured as follows: The movable portion 21 and the first connecting portions 23 and 24 form a first oscillation system that pivots (swings) around the axial line Y1; and the frame portion 22 and the pair of second connecting portions 25 and 26 form a second oscillation system that pivots (swings) around the axial line X1.

In the first oscillation system, the movable portion 21 has a circular shape in a plan view viewed in the plate thickness direction of the movable portion. The movable portion 21 does not necessarily have a specific shape as long as the movable portion 21 can be disposed inside the frame portion 22 and may, for example, have a rectangular shape, a crossed line shape, or a polygonal shape other than a rectangular shape in the plan view.

A light reflection surface is formed in a deposition process on the upper side of the thus configured movable portion 21 to form the light reflector 41.

Each of the first connecting portions 23 and 24 has a longitudinal shape elongated along the axial line Y1 and is elastically deformable. Each of the first connecting portions 23 and 24 connects the movable portion 21 to the frame portion 22 in such a way that the movable portion 21 can pivot with respect to the frame portion 22. The thus configured first connecting portions 23 and 24 are formed coaxially with each other and allow the movable portion 21 to pivot with respect to the frame portion 22 around the axial line Y1.

Further, each of the first connecting portions 23 and 24 has a rectangular transverse cross-sectional shape. In the present embodiment, each of the first connecting portions 23 and 24 has upper and lower surfaces parallel to each other along the plate surfaces of the movable portion 21 and a pair of side surfaces parallel to each other and perpendicular to the upper and lower surfaces. Each of the first connecting portions 23 and 24 does not necessarily have the transverse cross-sectional shape described above and may have, for example, a trapezoidal or parallelogram transverse cross-sectional shape. Further, each of the first connecting portions 23 and 24 may be formed of a plurality of beam members parallel to each other.

In the second oscillation system, the frame portion 22 has a rectangular ring-like shape in a plan view viewed in the plate thickness direction of the frame portion 22. The frame portion 22 does not necessarily have a specific shape in the plan view as long as it has a frame-like shape and may, for example, have a circular ring-like shape.

Figure 4:
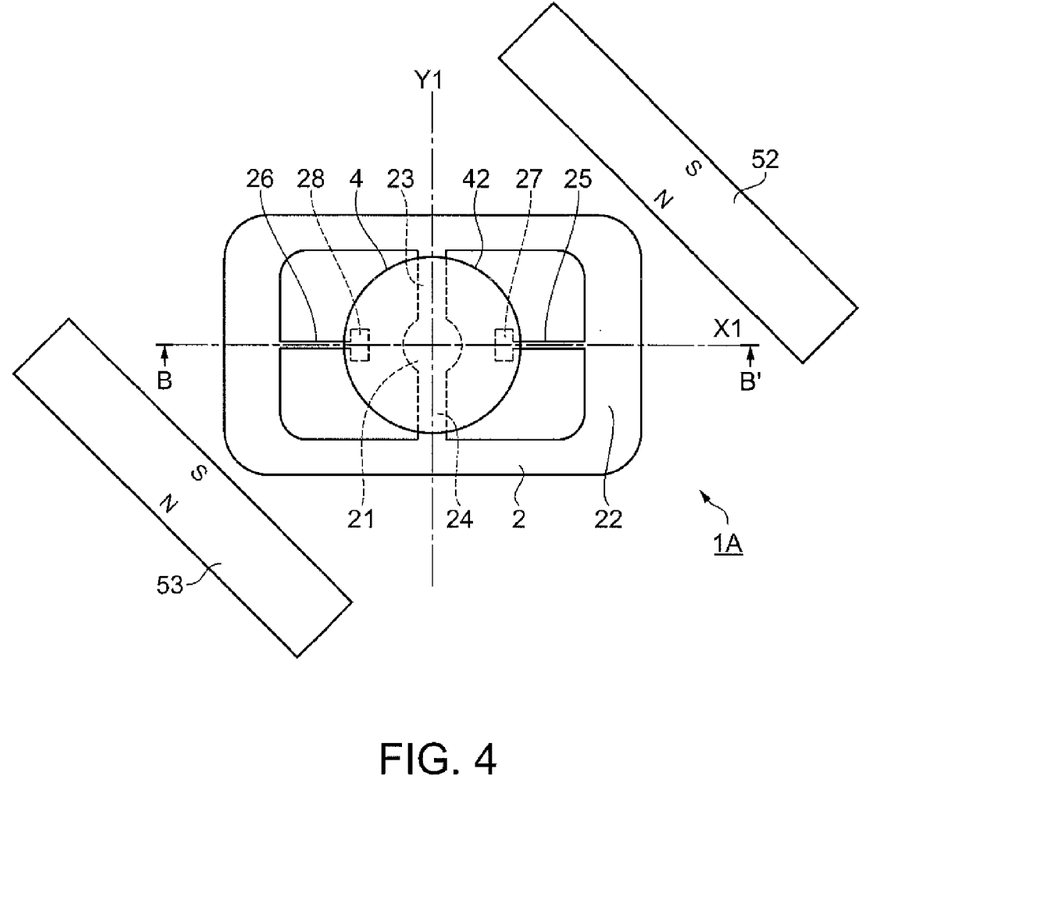
FIG. 4 is a plan view (top view) of an optical scanner (actuator) according to a second embodiment of the invention.

An insulating layer 711 is provided on the lower surface (one of the plate surfaces) of the frame portion 22. On the other hand, an insulating layer 712 is provided on the upper surface (the other plate surface) of the base 2 (see FIG. 2). A conductor pattern 8, which is formed of a coil 51, wiring lines 72 and 73, and electrodes 74 and 75, is provided on the surface of the insulating layer 711 that faces away from the base 2 (see FIG. 3). The coil 51, the wiring lines 72 and 73, and the electrodes 74 and 75 will be described in detail in a section where the driver 5 is described. In FIGS. 1, 3, and 4, the insulating layers 711 and 712 are omitted for ease of description. It is noted that FIG. 3 shows the wiring lines and the coil in a see-through view viewed from the upper side of FIG. 1 for ease of illustration.

Further, the thickness of each of the insulating layers 711 and 712 is not limited to a specific value but is, for example, greater than or equal to about 10 nm but smaller than or equal to about 1500 nm.

Each of the second connecting portions 25 and 26 has a longitudinal shape elongated along the axial line X1 and is elastically deformable. The second connecting portions 25 and 26 connect the frame portion 22 to the support portions 27, 28 in such a way that the frame portion 22 can pivot with respect to the support portions 27 and 28. The thus configured second connecting portions 25 and 26 are formed coaxially with each other and allow the frame portion 22 to pivot with respect to the support portions 27 and 28 around the axial line X1.

Further, each of the second connecting portions 25 and 26 has a rectangular transverse cross-sectional shape. In the present embodiment, each of the second connecting portions 25 and 26 has upper and lower surfaces parallel to each other along the plate surfaces of the frame portion 22 and a pair of side surfaces parallel to each other and perpendicular to the upper and lower surfaces. Each of the second connecting portions 25 and 26 does not necessarily have the transverse cross-sectional shape described above but may have, for example, a trapezoidal or parallelogram transverse cross-sectional shape. Further, each of the second connecting portions 25 and 26 may be formed of a plurality of beam members parallel to each other.

The support 3 has a function of supporting the base 2 described above. The support 3 further has a function of supporting permanent magnets 52 and 53, which are part of the driver 5, which will be described later.

The support 3 has a box-like shape having a recess 31, which is open upward. In other words, the support 3 is formed of a plate-shaped portion 32, which has a plate-like shape, and a frame-shaped portion 33, which has a frame-like shape and is formed along an outer circumferential portion of the upper surface of the plate-shaped portion 32.

The lower surfaces of the support portions 27 and 28 of the base 2 described above are bonded to part of the upper surface of the support 3 or the portion outside the recess 31, that is, the upper surface of the frame-shaped portion 33. As a result, a space that allows pivotal motion of the movable portion 21 is created between the base 2, specifically, the movable portion 21 and the pair of connecting portions 23 and 24, and the support 3.

The material of which the support 3 is made is not limited to a specific one and may, for example, be quartz glass, PYREX (registered trade mark) glass, TEMPAX (registered trade mark) glass, or any other glass material; single crystal silicon, polysilicon, or any other silicon material; and LTCC (low-temperature co-fire ceramic).

A method for bonding the base 2 to the support 3 is not limited to a specific one and is determined as appropriate in accordance with the material, the shape, and other factors of the support 3. Examples of the method may include an adhesive-based method, anodic bonding and direct bonding.

Further, the frame-shaped portion 33 is provided with electrodes 76 and 77, which work as a voltage application portion, and the electrodes 76 and 77 are electrically connected to the electrodes 74 and 75 provided on the base 2. When a voltage applicator applies a voltage between the electrodes 76 and 77, the coil 51 can be energized.

The driver 5, which includes the coil 51 and the pair of permanent magnets 52 and 53, causes pivotal motion of the movable portion 21 and the frame portion 22 of the base 2 described above based on an electromagnetic drive method (more specifically, moving coil method). The electromagnetic drive method allows generation of a large drive force. The driver 5 based on the electromagnetic drive method can therefore produce a large pivotal angle of the light reflector 41 while using a reduced drive voltage.

In the present embodiment, the coil 51 is disposed on the lower surface of the frame portion 22 via the insulating layer 711, as shown in FIG. 2.

In the present embodiment, the coil 51 has a helical shape around the movable portion 21 along the plate surface of the frame portion 22, as shown in FIG. 3. The helical coil 51 can produce a large magnetic force as compared with a simple annular coil and can also be simply configured and readily manufactured as compared with a coil formed by stacking each wire in the thickness direction of the frame portion 22. That is, the configuration of the coil 51 can be relatively simplified and the magnetic force produced by the coil 51 can be increased with a drive voltage reduced.

One end of a wire that forms the coil 51 (outer circumferential end of helical wire) is electrically connected to the electrode 74 via the wiring line 72. On the other hand, the other end of the wire that forms the coil 51 (center-side end of helical wire) is electrically connected to the electrode 75 via the wiring line 73. The coil 51 can therefore be energized by applying a voltage between the electrodes 74 and 75.

The wiring line 72 is disposed on the lower surface of the second connecting portion 25 along the longitudinal direction thereof, and the wiring line 73 is disposed on the lower surface of the second connecting portion 26 along the longitudinal direction thereof.

The electrodes 74 and 75 are disposed on the lower surfaces of the support portions 27 and 28, respectively.

The wiring line 72 intersects the coil 51 on the frame portion 22 and extends out of the frame portion 22. An insulating layer 713, which is formed, for example, of a silicon oxide film or a silicon nitride film, is therefore provided between the wiring line 72 and the coil 51 to avoid an electrical short circuit.

The other end of the wire that forms the coil 51 (center-side end of helical wire) may be connected to the wiring line 73 by using a bonding wire interposed therebetween.

The coil 51, the wiring lines 72 and 73, and the electrodes 74 and 75, which form the conductor pattern 8, are not necessarily made of a specific material and may be made of any suitable conductive material. Examples of the material may include Cu, Ag, Al, Pt, Ir, Os, Re, W, Ta, Ru, Tc, Mo, Nb, Au, Cr, and Ni. The conductor pattern may be made of a combination of a plurality of the materials described above.

On the other hand, the pair of permanent magnets 52 and 53 are bonded and fixed to the support 3.

The pair of permanent magnets 52 and 53 are disposed on opposite sides of the base 2 in a plan view. The pair of permanent magnets 52 and 53 are further so disposed that they produce a magnetic field passing through the base 2 along an axial line "a" (see FIG. 1) inclined to both the axial lines X1 and Y1 in a plan view.

That is, the permanent magnet 52 is so disposed that one end thereof facing the base 2 forms a north pole and the other end thereof forms a south pole, whereas the permanent magnet 53 is so disposed that one end thereof facing the base 2 forms a south pole and the other end thereof forms a north pole. The orientations of the poles of the permanent magnets 52 and 53 may be reversed from those described above.

Each of the permanent magnets 52 and 53 is not limited to a specific one and can, for example, preferably be a neodymium magnet, a ferrite magnet, a samarium-cobalt magnet, an alnico magnet, a bonded magnet, or any other magnet formed of a magnetized hard magnetic material.

The number, arrangement, polarity, and other factors of permanent magnets are, of course, not limited to those shown in the drawings and may be arbitrarily determined as long as the movable portion 21 and the frame portion 22 are allowed to make pivotal motion based on interaction between the magnetic fields produced by the magnets and the coil 51.

The inclination angle of the axial line "a" with respect to the axial lines X1 and Y1 in a plan view preferably ranges from 30 to 60 degrees, more preferably from 40 to 50 degrees, and is still more preferably about 45 degrees. The thus disposed permanent magnets 52 and 53 allow the movable portion 21 to make smooth pivotal motion around the axial lines X1 and Y1. In the present embodiment, the axial line "a" is inclined to the axial lines X1 and Y1 by about 45 degrees.

Under the magnetic field produced by the pair of thus disposed permanent magnets 52 and 53, a power supply (not shown) applies a first voltage or a first current that periodically changes at a first frequency and a second voltage or a second current that periodically changes at a second frequency to the coil 51. As a result, the movable portion 21 pivots around the axial line Y1 at the first frequency, and the frame portion 22 pivots around the axial line X1 at the second frequency.

The optical scanner 1, which is a single optical scanner, can thus perform two-dimensional optical scanning. An apparatus that requires two-dimensional scanning can therefore be reduced in size. Further, using the thus configured optical scanner 1 allows an apparatus that requires two-dimensional scanning to be readily manufactured, unlike in a case where two one-dimensional scanning optical scanners are combined with each other to achieve two-dimensional scanning in which alignment between the two optical scanners is required.

Further, in the present embodiment, since the scanner structure is disposed inside the frame portion 22, the distance between the frame portion 22 and the permanent magnets 52, 53 can be reduced. That is, the distance between the coil 51 and the permanent magnets 52, 53 can be reduced. As a result, the optical scanner 1 can be efficiently driven for scanning.

The optical scanner described above can suitably be used in a projector, a laser printer, an imaging display, a barcode reader, a scanning confocal microscope, and other image formation apparatus. Such an image formation apparatus therefore has excellent image drawing characteristics.

The image formation apparatus, which includes the optical scanner 1 described above, operates at a low power consumption rate.

Second Embodiment

Figure 5:
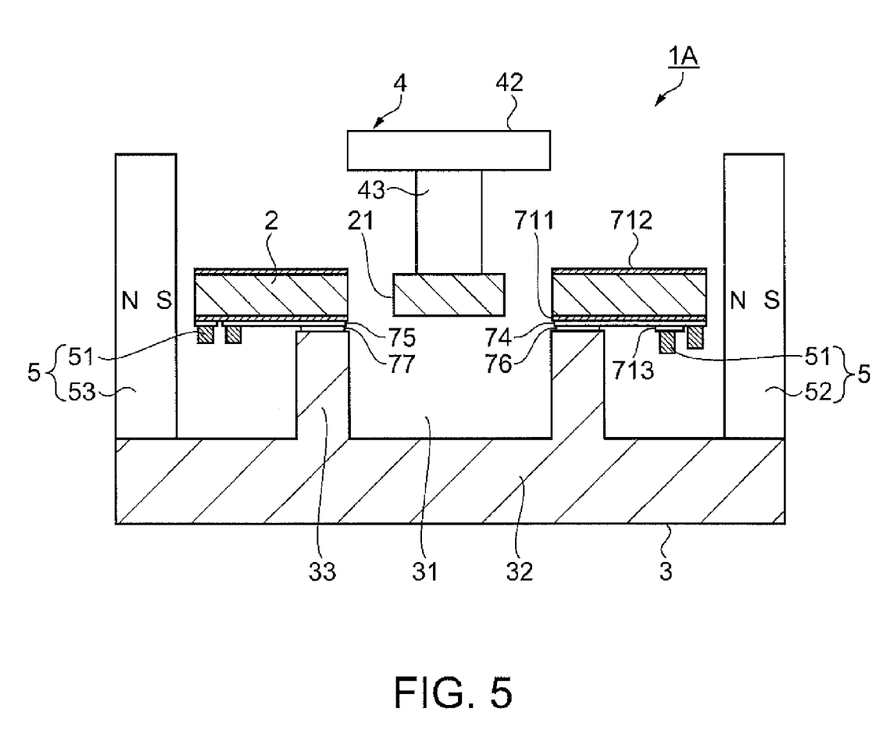
FIG. 5 is a cross-sectional view taken along the line B-B' in FIG. 4.

A second embodiment of the invention will next be described. FIG. 4 is a plan view of an optical scanner (actuator) according to the second embodiment of the invention. FIG. 5 is a cross-sectional view taken along the line B-B' in FIG. 4.

The optical scanner according to the second embodiment will be described below primarily about differences from the optical scanner according to the first embodiment described above, and no description about the same points will be made.

An optical scanner 1A according to the second embodiment is substantially the same as the optical scanner 1 according to the first embodiment except that a mirror holder 4 is fixed to the movable portion 21.

The mirror holder 4 is connected to the movable portion 21, as shown in FIGS. 4 and 5. The mirror holder 4 has a light reflector 42, on which a light reflection surface is provided, and a fixing portion 43, which extends from the light reflector 42 and is fixed to the movable portion 21.

The thus configured mirror holder 4 is made of silicon as is the case with the base 2, and the light reflector 42 and the fixing portion 43 are formed integrally with each other.

Since silicon is light and as rigid as stainless steel (SUS), the mirror holder 4 made of silicon has excellent flatness. Further, since silicon can be processed in an etching process with highly precise dimensional accuracy as will be described later, the mirror holder 4 formed of a silicon substrate is allowed to have a desired shape. A single crystal silicon substrate is typically used as the silicon substrate.

The mirror holder 4 will be described below in more detail.

The light reflector 42 has a plate-like shape, as shown in FIG. 4. In the present embodiment, the light reflector 42 has a circular shape in a plan view. The light reflector 42 does not necessarily have a circular shape in the plan view and may have, for example, a rectangular shape, a crossed line shape, a pentagonal shape, a hexagonal shape, or any other polygonal shape or an elliptical shape.

A light reflection surface is provided on the upper side of the thus configured light reflector 42. The light reflection surface is produced by forming a metal film made, for example, of gold, silver, or aluminum on the light reflector for example, in an evaporation process, and the thus formed surface has light reflectivity.

Further, the fixing portion 43 is provided on the lower surface of the light reflector 42.

The fixing portion 43 has a columnar shape. In the present embodiment, the fixing portion 43 has a circular shape in a plan view. The fixing portion 43 does not necessarily have a circular shape in a plan view and may have, for example, a rectangular shape, a crossed line shape, a pentagonal shape, a hexagonal shape, or any other polygonal shape or an elliptical shape.

In the mirror holder 4, the fixing portion 43 has one end connected to the light reflector 42 and the other end fixed to the movable portion 21 of the base 2, as shown in FIG. 5. That is, the light reflector 42 is fixed to the movable portion 21 via the fixing portion 43.

The fixing portion 43 can be fixed to the movable portion 21, for example, by using an adhesive, metal bonding using a metal thin film, solder bonding, anodic bonding, or direct bonding.

As described above, the configuration in which the light reflector 42 is fixed to the movable portion 21 via the fixing portion 43 prevents the size of the optical scanner 1A from increasing but allows the size thereof to be reduced even when the area of the plate surfaces of the light reflector 42 is increased.

Third Embodiment

Figure 6:
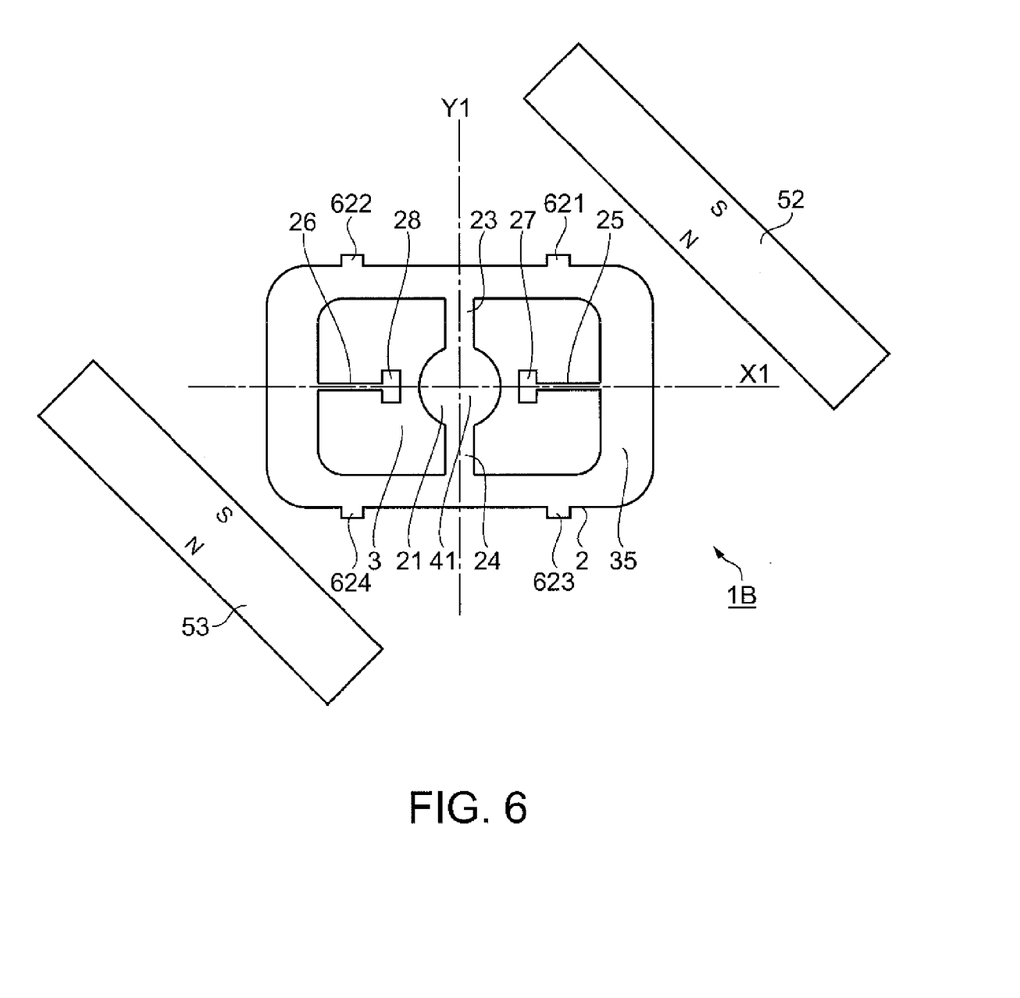
FIG. 6 is a plan view (top view) of an optical scanner (actuator) according to a third embodiment of the invention.

A third embodiment of the invention will next be described. FIG. 6 is a plan view of an optical scanner (actuator) according to the third embodiment of the invention.

The optical scanner according to the third embodiment will be described below primarily about differences from the optical scanner according to the first embodiment described above, and no description about the same points will be made.

An optical scanner 1B according to the third embodiment is substantially the same as the optical scanner 1 according to the first embodiment except that protrusions 621, 622, 623, and 624 are formed on a frame portion 35 integrally therewith.

The protrusions 621, 622, 623, and 624 are connected to the frame portion 35, as shown in FIG. 6. A plurality of optical scanners 1B are connected to a frame (not shown) via the protrusions 621, 622, 623, and 624 in a manufacturing process. The optical scanners 1B can be separated from the frame into individual optical scanners.

In FIG. 6, each of the protrusions 621, 622, 623, and 624 has a rectangular shape in a plan view but does not necessarily have a rectangular shape and may have, for example, a circular shape, a crossed line shape, a pentagonal shape, a hexagonal shape, or any other polygonal shape or an elliptical shape.

As described above, a plurality of optical scanners 1B can be simultaneously manufactured by bonding the optical scanners in a manufacturing process to the frame via the protrusions 621, 622, 623, and 624, whereby each of the optical scanners 1B can be manufactured at low cost.

Image Formation Apparatus

An image formation apparatus according to an embodiment of the invention will be described.

Projector

Figure 7:
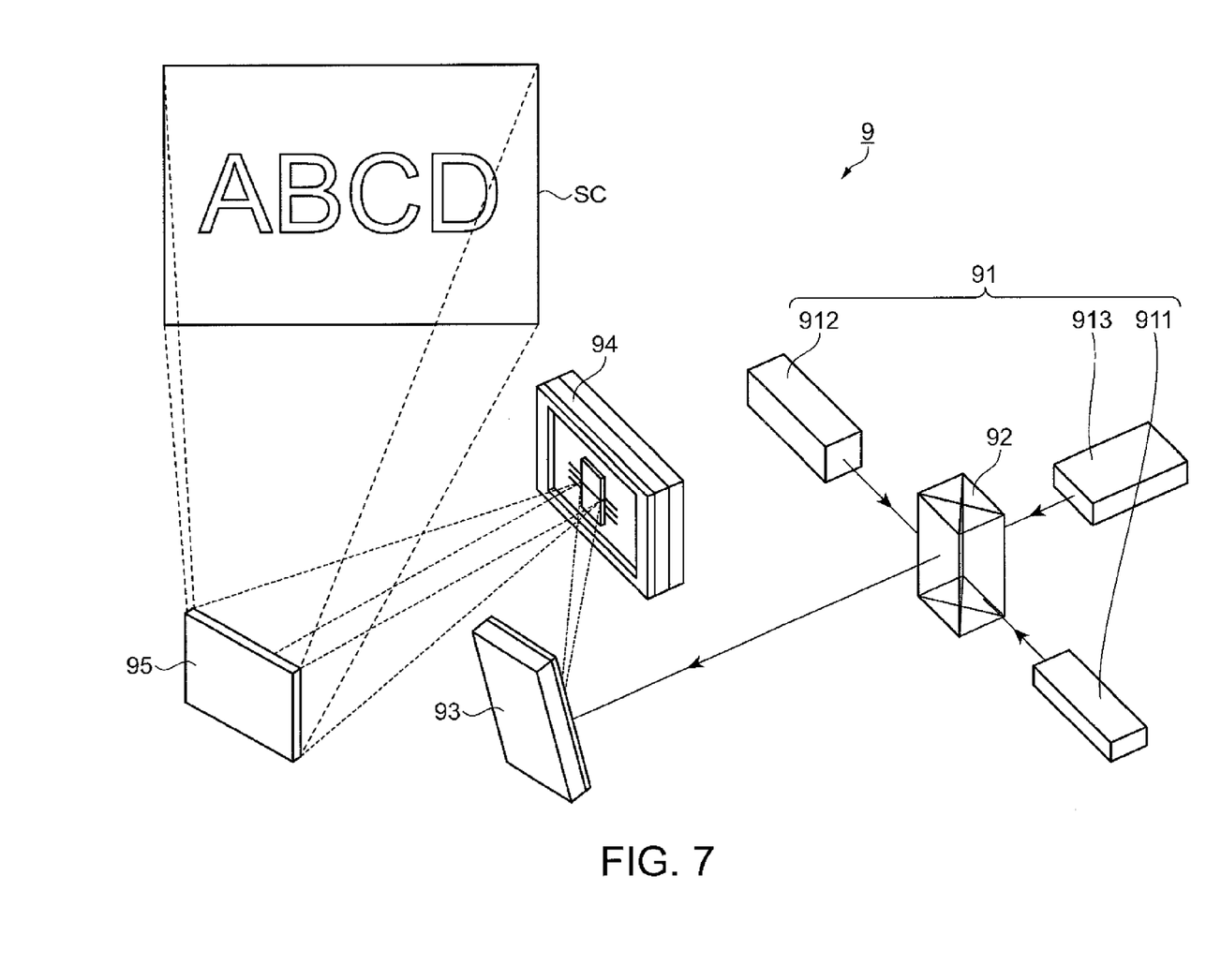
FIG. 7 is a schematic view showing an image formation apparatus according to an embodiment (projector) of the invention.

FIG. 7 is a schematic view showing the image formation apparatus according to the embodiment (projector) of the invention. In the following description, the longitudinal direction of a screen SC is called a "horizontal direction," and the direction perpendicular to the longitudinal direction is called a "vertical direction," for ease of description.

A projector 9 shown in FIG. 7 includes a light source unit 91, which outputs laser light or any other type of light, a cross dichroic prism 92, a pair of optical scanners 93 and 94 (optical scanner configured in the same manner as the optical scanner 1, 1A, or 1B, for example), and a fixed mirror 95.

The light source unit 91 includes a red light source 911, which emits red light, a blue light source 912, which emits blue light, and a green light source 913, which emits green light.

The cross dichroic prism 92 is an optical element that is formed by bonding four rectangular prisms and combines the light beams emitted from the red light source 911, the blue light source 912, and the green light source 913.

In the thus configured projector 9, the cross dichroic prism 92 combines the light beams emitted from the red light source 911, the blue light source 912, and the green light source 913 based on image information from a host computer (not shown), and the combined light is continuously deflected by the optical scanners 93 and 94, is reflected off the fixed mirror 95, and forms a color image on the screen SC.

How the optical scanners 93 and 94 perform optical scanning will be specifically described.

The combined light from the cross dichroic prism 92 is first continuously deflected by the optical scanner 93 in the horizontal direction (primary scan). The light continuously deflected in the horizontal direction is then further continuously deflected by the optical scanner 94 in the vertical direction (secondary scan). A two-dimensional color image can thus be formed on the screen SC. Using the optical scanner according to any of the embodiments of the invention as each of the optical scanners 93 and 94 provides extremely excellent image drawing characteristics.

It is, however, noted that the projector 9 is not necessarily configured as described above but can be configured differently as long as the optical scanners 93 and 94 perform optical scanning to form an image on an object. For example, the fixed mirror 95 may be omitted.

According to the thus configured projector 9, which includes the optical scanners 93 and 94, each of which has the same configuration as that of the optical scanner 1, 1A, or 1B described above, a high-quality image can be produced at low power consumption.

Head-Up Display

Figure 8:
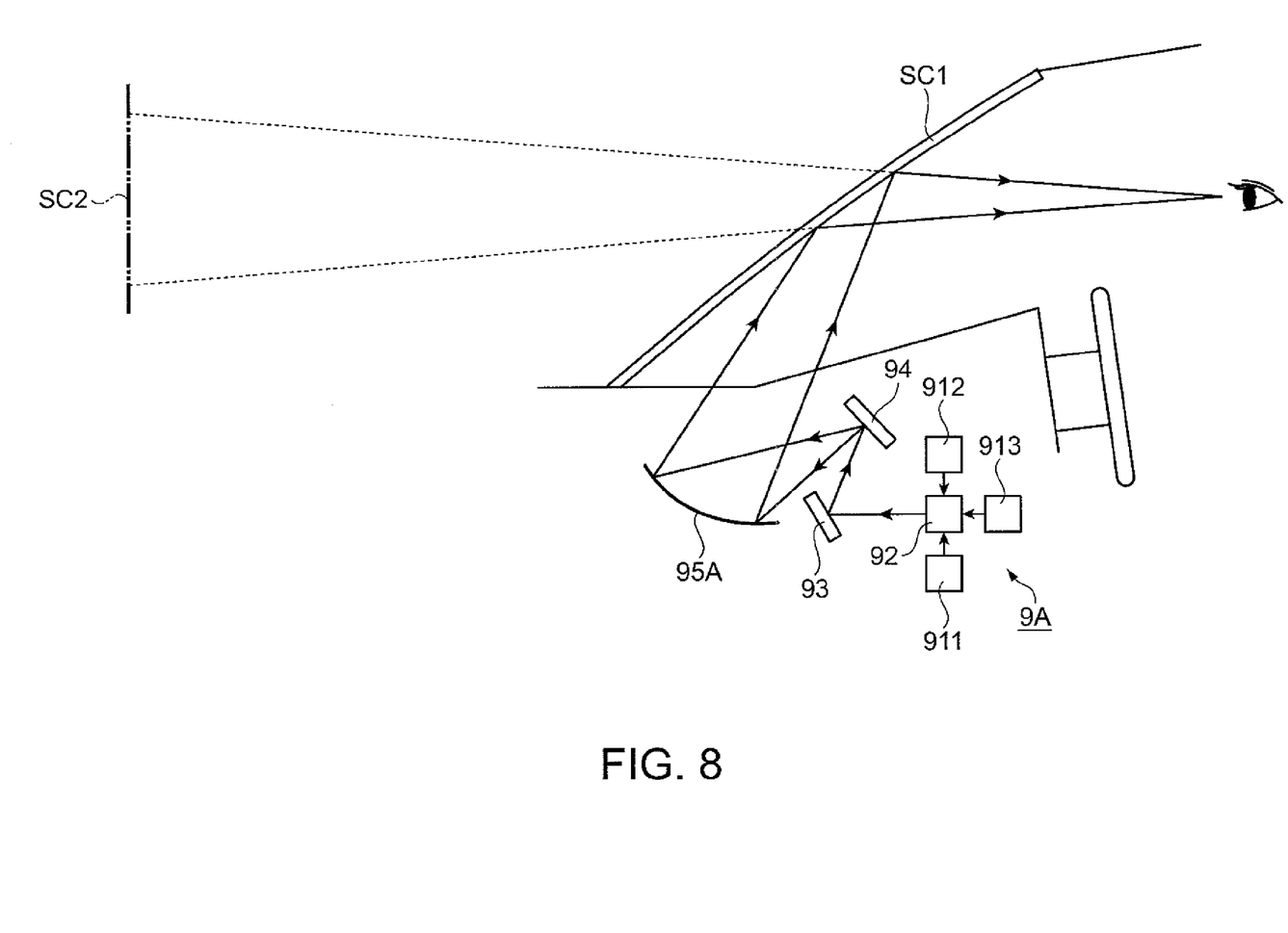
FIG. 8 is a schematic view showing an image formation apparatus according to another embodiment (head-up display) of the invention.

FIG. 8 is a schematic view showing an image formation apparatus according to another embodiment (head-up display) of the invention. The same components as those of the projector 9 described above will not be described below.

A head-up display 9A shown in FIG. 8 is an apparatus that is used in an automobile, an airplane, or any other moving vehicle and projects a variety of information on a windshield SC1.

The head-up display 9A includes the red light source 911, the blue light source 912, the green light source 913, the cross dichroic prism 92, the optical scanners 93 and 94, and a fixed mirror 95A.

The fixed mirror 95A is a concave mirror and projects light from the optical scanner 94 onto the windshield SC1. A driver of the moving vehicle can therefore visually recognize a displayed imaged as a virtual image on an imaginary plane SC2 located in front of the windshield SC1.

The actuators, the optical scanners, and the image formation apparatus have been described with reference to the illustrated embodiments, but the invention is not limited thereto. For example, the configuration of each portion of each of the actuators, the optical scanners, and the image formation apparatus according to the embodiments of the invention can be replaced with an arbitrary configuration that provides the same function as that provided in the embodiments, and an arbitrary component can be added.

The above embodiments have been described with reference to the case where the movable portion has a symmetrical shape with respect to at least one of the pivotal central axis and a line perpendicular thereto in a plan view, but the movable portion is not necessarily shaped this way. The movable portion may have an asymmetrical shape with respect both to the pivotal central axis and the line perpendicular thereto in the plan view.

Further, the above embodiments have been described with reference to the case where a pair of connecting portions that pivotally connect the movable portion to the support portions are provided, but the number of connecting portions may be one or three or more as long as they pivotally connect the movable portion to the support portions.

The above embodiments have been described with reference to the case where the actuator is used as an optical scanner, but the actuator according to any of the embodiments of the invention is not necessarily used as an optical scanner. For example, the actuator according to any of the embodiments of the invention can be used as an optical switch, an optical attenuator, or any other optical device.

The above embodiments have been described with reference to the case where the driver that allows pivotal motion of the movable portion operates based on a moving coil electromagnetic drive method. The driver may instead operate based on an electrostatic drive method, a piezoelectric drive method, or any other non-electromagnetic drive method.

Further, the above embodiments have been described with reference to the case where the conductor pattern provided on the base via an insulating layer has a coil, but the conductor pattern is not necessarily configured this way when the purpose of the conductor pattern is electrical conduction. For example, the conductor pattern may include wiring lines for conducting electricity to a variety of drive sources, wiring lines connected to a variety of sensors, and other wiring lines.

The entire disclosure of Japanese Patent Application No. 2012-284491, filed Dec. 27, 2012 is expressly incorporated by reference herein.

What is claimed is:

1. An actuator comprising:
    a movable portion that swingably moves around a first axis;
    a first shaft that extends from the movable portion and swingably supports the movable portion around the first axis;
    a frame portion that is connected to the first shaft and swingably moves around a second axis that intersects the first axis, wherein the first shaft is connected directly to the frame portion and extends inwardly from the frame portion;
    a second shaft that extends from the frame portion and swingably supports the frame portion around the second axis;
    a support portion connected to the second shaft;
    a coil provided on the frame portion; and
    a magnet that produces a magnetic field that acts on the coil,
    wherein the frame portion is so formed that the frame portion surrounds the movable portion, the first shaft, the second shaft, and the support portion in a plan view viewed in a thickness direction of the movable portion.

2. The actuator according to claim 1,
    wherein the movable portion is provided with a light reflector having light reflectivity.

3. The actuator according to claim 1,
    wherein a mirror holder is fixed to the movable portion,
    the mirror holder has a light reflector having light reflectivity and a fixing portion that extends from one surface of the light reflector in a thickness direction of the light reflector, and
    the movable portion and an end of the fixing portion are connected to each other.

4. The actuator according to claim 3,
    wherein the light reflector and the fixing portion are formed integrally with each other.

5. The actuator according to claim 1, further comprising a voltage application portion that applies a voltage to the coil,
    wherein when the voltage application portion applies the voltage to the coil, the movable portion is caused to swing around the first axis and the second axis.

6. An optical scanner comprising:
    a movable portion that includes a light reflector having light reflectivity and swingably moves around a first axis;
    a first shaft that extends from the movable portion and swingably supports the movable portion around the first axis;
    a frame portion that is connected to the first shaft and swingably moves around a second axis that intersects the first axis, wherein the first shaft is connected directly to the frame portion and extends inwardly from the frame portion;
    a second shaft that extends from the frame portion and swingably supports the frame portion around the second axis;
    a support portion connected to the second shaft;
    a coil provided on the frame portion; and
    a magnet that produces a magnetic field that acts on the coil,
    wherein the frame portion is so formed that the frame portion surrounds the movable portion, the first shaft, the second shaft, and the support portion in a plan view viewed in a thickness direction of the movable portion.

7. An image formation apparatus comprising:
    a light source unit; and
    an optical scanner that continuously deflects light from the light source unit,
    wherein the optical scanner includes
        a movable portion that includes a light reflector having light reflectivity and swingably moves around a first axis;
        a first shaft that extends from the movable portion and swingably supports the movable portion around the first axis;
        a frame portion that is connected to the first shaft and swingably moves around a second axis that intersects the first axis, wherein the first shaft is connected directly to the frame portion and extends inwardly from the frame portion;
        a second shaft that extends from the frame portion and swingably supports the frame portion around the second axis;
        a support portion connected to the second shaft;
        a coil provided on the frame portion; and
        a magnet that produces a magnetic field that acts on the coil; and
    the frame portion is so formed that the frame portion surrounds the movable portion, the first shaft, the second shaft, and the support portion in a plan view viewed in a thickness direction of the movable portion.

8. The actuator according to claim 1,
    wherein the second shaft extends inwardly from the frame portion.

9. The actuator according to claim 1,
    wherein the support portion is bonded to a support.

* * * * *